United States Patent
Pan et al.

(10) Patent No.: US 6,876,552 B2
(45) Date of Patent: Apr. 5, 2005

(54) ELECTRONIC DEVICE WITH A COVER FOR COVERING AN ELECTRONIC CARD IN A RECESS IN THE ELECTRONIC DEVICE

(75) Inventors: Long-Jyh Pan, Hsi-Chih (TW); Wen-Kuei Li, Hsin-Tien (TW)

(73) Assignee: Benq Corporation, Tao-Yuan Hsien (TW)

( * ) Notice: Subject to any disclaimer, the term of this patent is extended or adjusted under 35 U.S.C. 154(b) by 64 days.

(21) Appl. No.: 10/623,181

(22) Filed: Jul. 17, 2003

(65) Prior Publication Data

US 2004/0062010 A1 Apr. 1, 2004

(30) Foreign Application Priority Data

Jul. 18, 2002 (TW) ........................................ 91210978 U

(51) Int. Cl.[7] ................................................. H05K 7/14
(52) U.S. Cl. .......................... 361/730; 361/684; 439/331
(58) Field of Search ................................. 361/759, 755, 361/796, 747, 392, 403; 439/331, 73; 248/118, 118.5; 174/50, 50.51, 50.54, 52.1, 66; D13/146–147

(56) References Cited

U.S. PATENT DOCUMENTS

| | | | | |
|---|---|---|---|---|
| 5,109,980 A | * | 5/1992 | Matsuoka et al. | 206/724 |
| D423,455 S | * | 4/2000 | Konno et al. | D13/147 |
| 6,273,739 B1 | * | 8/2001 | Konno et al. | 439/331 |
| 6,334,786 B1 | * | 1/2002 | Lee | 439/331 |

* cited by examiner

Primary Examiner—Lynn Feild
Assistant Examiner—Zachary Pape
(74) Attorney, Agent, or Firm—Ladas & Parry LLP

(57) ABSTRACT

An electronic device includes a housing that is formed with a recess for receiving an electronic card, and a groove extending from the recess. A pivot pin is mounted in the groove. A cover is hooked on the pivot pin for covering the electronic card. The groove has a bight portion divided into first and second sections which are respectively spaced apart from the pivot pin by first and second gaps. A hook on the cover has a width smaller than that of the first gap and greater than that of the second gap.

2 Claims, 7 Drawing Sheets

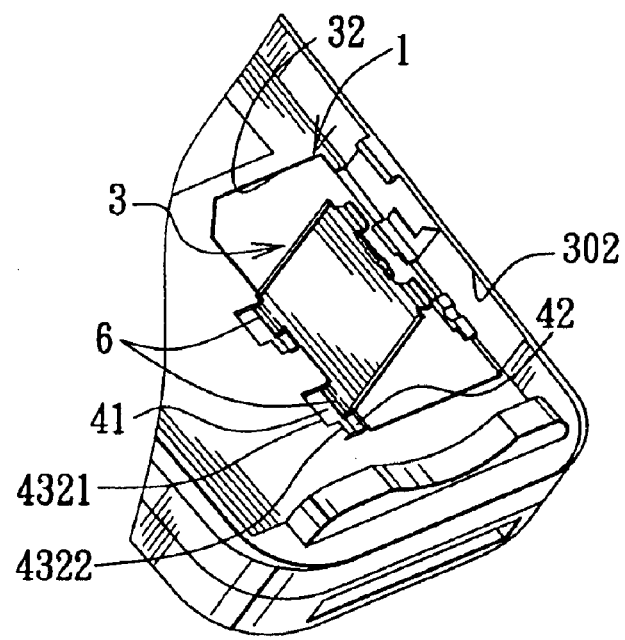
F I G. 4
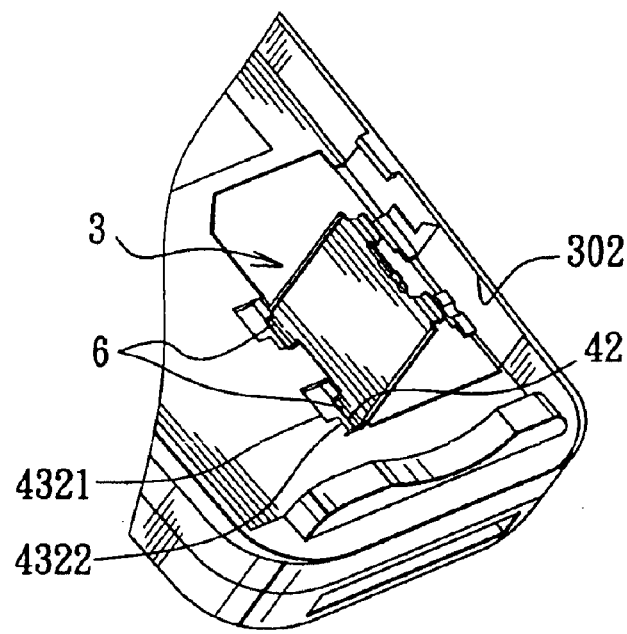
F I G. 5

ELECTRONIC DEVICE WITH A COVER FOR COVERING AN ELECTRONIC CARD IN A RECESS IN THE ELECTRONIC DEVICE

CROSS-REFERENCE TO RELATED APPLICATION

This application claims priority of Taiwanese Application No. 091210978, filed on Jul. 18, 2002.

BACKGROUND OF THE INVENTION

1. Field of the Invention

This invention relates to an electronic device with a cover for covering an electronic card in a recess in the electronic device.

2. Description of the Related Art

FIG. 1 illustrates an electronic device, such as a cellular phone, that includes a housing 90 formed with a recess 91, and an electronic card 92, such as a Subscriber Identification Module (SIM) card, mounted in the recess 91. A notch 93 extends from one side of the recess 91, and is confined by two opposite walls that are respectively formed with pivot slots 94. A cover 95 has a pivot side provided with a pivot 96 that extends into the pivot slots 94 for permitting rotation of the cover 95 between an uncovering position and a covering position, in which the cover 95 covers the electronic card 92 in the recess 91. First and second interlocking members 97, 98 are respectively formed on the cover 95 and the housing 90, and are engageable with each other for locking the cover 95 to the housing 90. The cover 95 is movable in a transverse direction relative to the pivot 96 (the pivot 96 is moved along with the cover 95 within the slots 94 in the transverse direction) so as to permit engagement and disengagement between the first and second interlocking members 97, 98.

The conventional electronic device is disadvantageous in that assembly of the cover 95 to the housing 90 is relatively inconvenient to conduct, thus resulting in a significantly increase in the manufacturing costs. Moreover, disassembly of the cover 95 from the housing 90 is relatively difficult.

SUMMARY OF THE INVENTION

Therefore, it is an object of the present invention to provide an electronic device that is capable of overcoming the aforesaid drawback of the prior art.

According to the present invention, there is provided an electronic device that comprises: a housing including a peripheral wall that is formed with a card-receiving recess having two opposite sides and confined by a recess-confining wall, the recess-confining wall including opposite first and second wall portions that respectively confine the opposite sides of the card-receiving recess, the first wall portion being formed with at least a pivot-mounting groove that is confined by a groove-confining wall, the groove-confining wall having two opposite ends and a bight portion that faces toward the second wall portion and that is divided into a first section and a second section offset from the first section, the card-receiving recess being adapted to receive an electronic card therein; at least a pivot pin substantially parallel to the bight portion of the groove-confining wall and having two opposite ends respectively extending into the opposite ends of the groove-confining wall, the pivot pin cooperating with the first section of the bight portion of the groove-confining wall to define a first gap therebetween, and cooperating with the second section of the bight portion of the groove-confining wall to define a second gap therebetween, the first gap having a width greater than that of the second gap; a cover with opposite first and second sides, the first side of the cover being formed with at least a hook that projects outwardly therefrom, that has a width smaller than that of the first gap and greater than that of the second gap, and a length smaller than that of the first gap, and that hooks on the pivot pin, the cover being rotatable about the pivot pin between a covering position, in which the second side of the cover is moved toward and presses against the electronic card, and an uncovering position, in which the second side of the cover is moved away from the electronic card so as to release the electronic card therefrom, the cover being movable along the length of the pivot pin between a limiting position, in which the hook is aligned with the second section of the bight portion of the groove-confining wall, thereby limiting movement of the cover in a transverse direction relative to the pivot pin and preventing disengagement of the hook from the pivot pin, and a non-limiting position, in which the hook is aligned with the first section of the bight portion of the groove-confining wall, thereby permitting movement of the cover in the transverse direction and disengagement of the hook from the pivot pin; and a locking unit including first and second interlocking members that are respectively formed on the second wall portion of the recess-confining wall and the second side of the cover and that are releasably engageable with each other when the cover is positioned at the covering position and is moved from the limiting position to the non-limiting position.

BRIEF DESCRIPTION OF THE DRAWINGS

In drawings which illustrate an embodiment of the invention,

FIG. 4 is a fragmentary perspective view showing a cover of the electronic device of FIG. 2 when simultaneously positioned at a non-limiting position and an uncovering position;

FIG. 5 is a fragmentary perspective view showing the cover of the electronic device of FIG. 2 when simultaneously positioned at a limiting position and the uncovering position;

DETAILED DESCRIPTION OF THE PREFERRED EMBODIMENT

Figure 1:
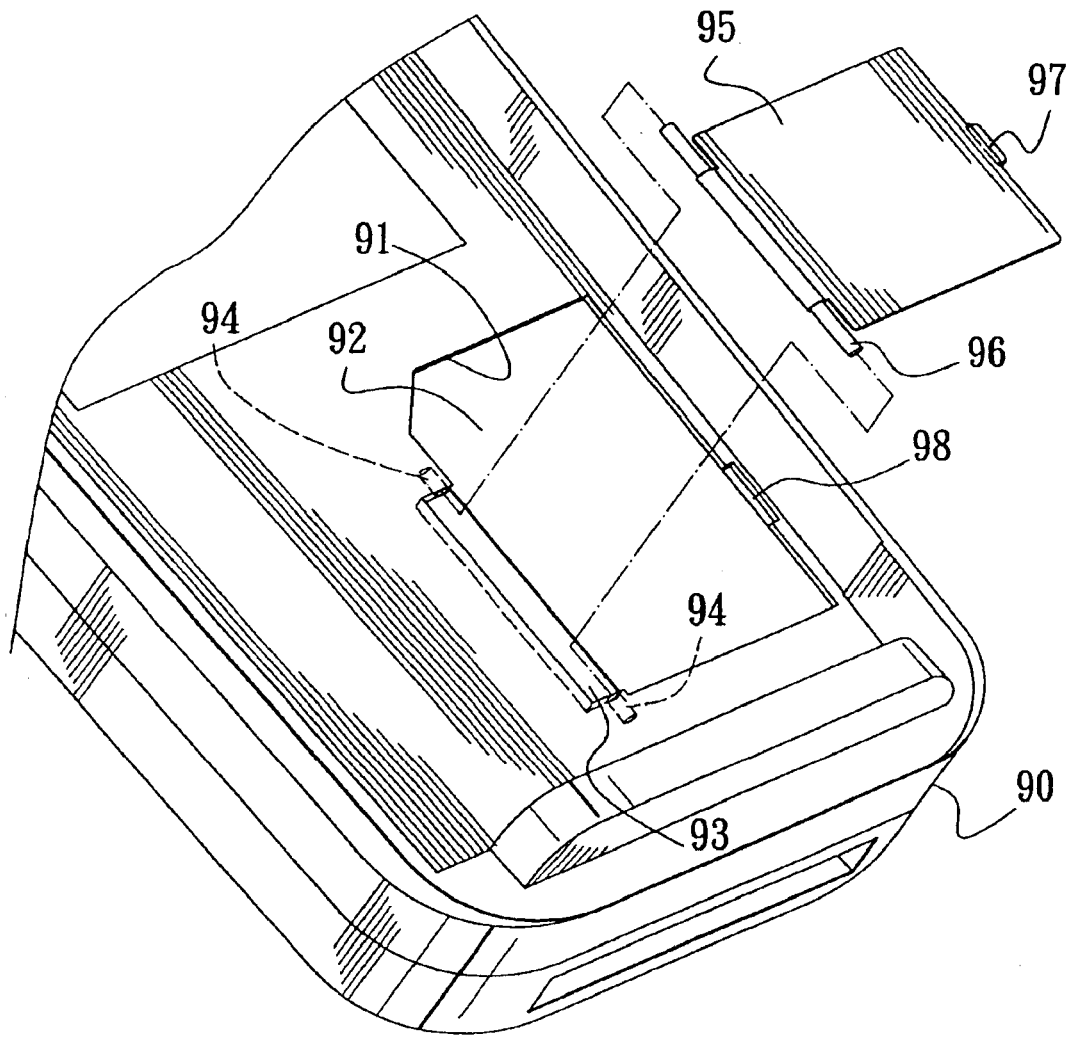
FIG. 1 is a fragmentary exploded perspective view of a conventional electronic device.
Figure 2:
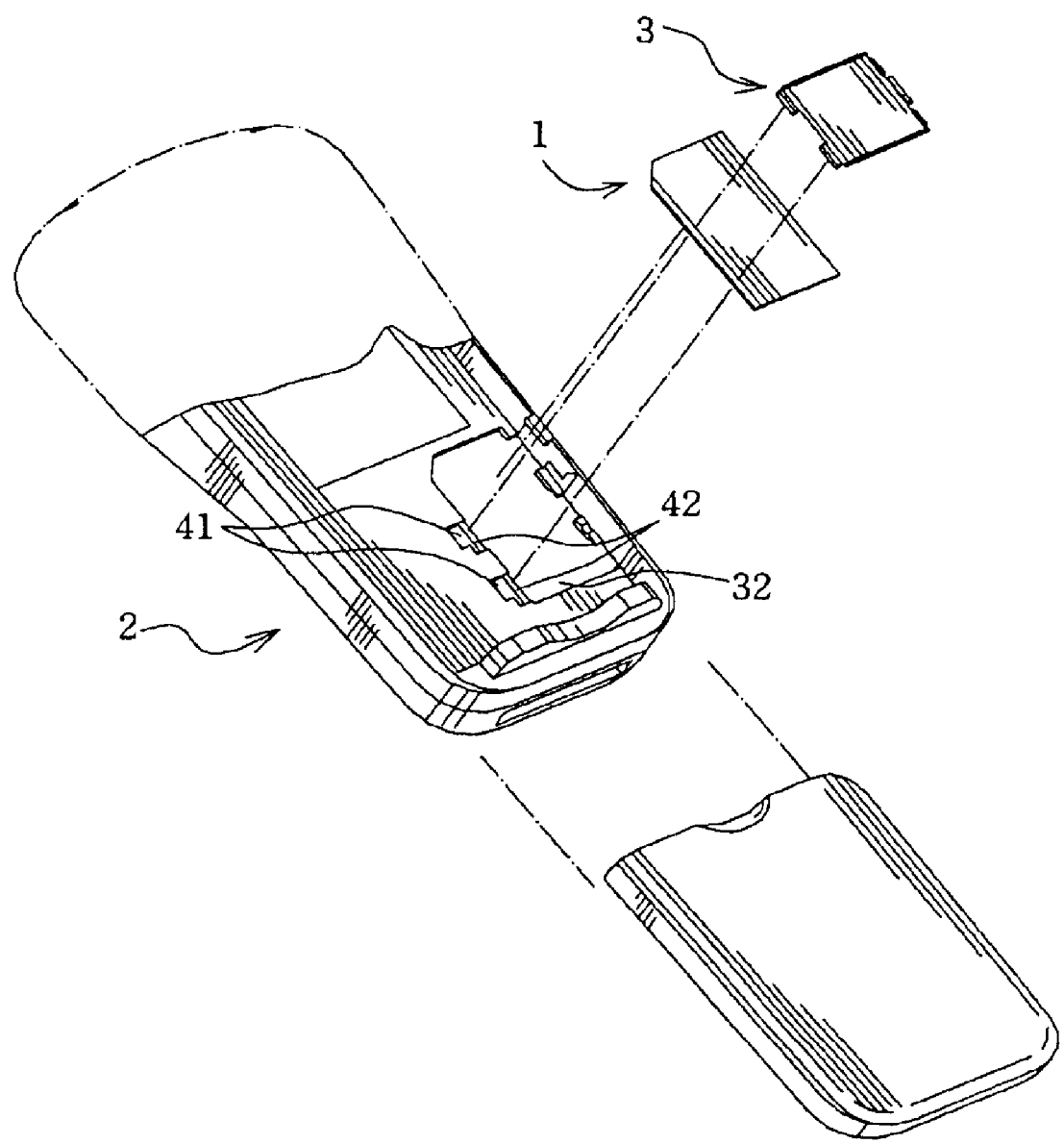
FIG. 2 is an exploded view of an electronic device embodying this invention, with a housing illustrated in part.
Figure 3:
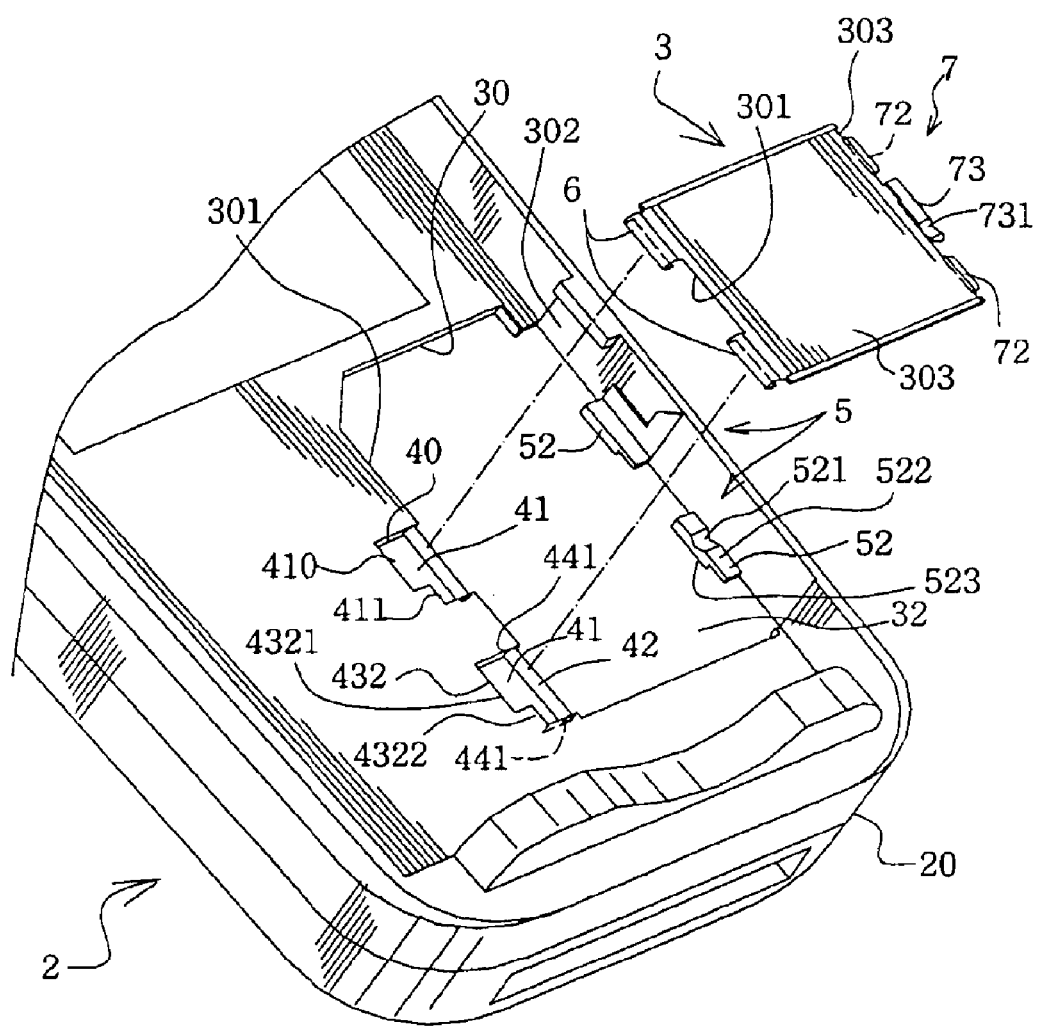
FIG. 3 is a fragmentary exploded perspective view of the electronic device of FIG. 2.
Figure 6:
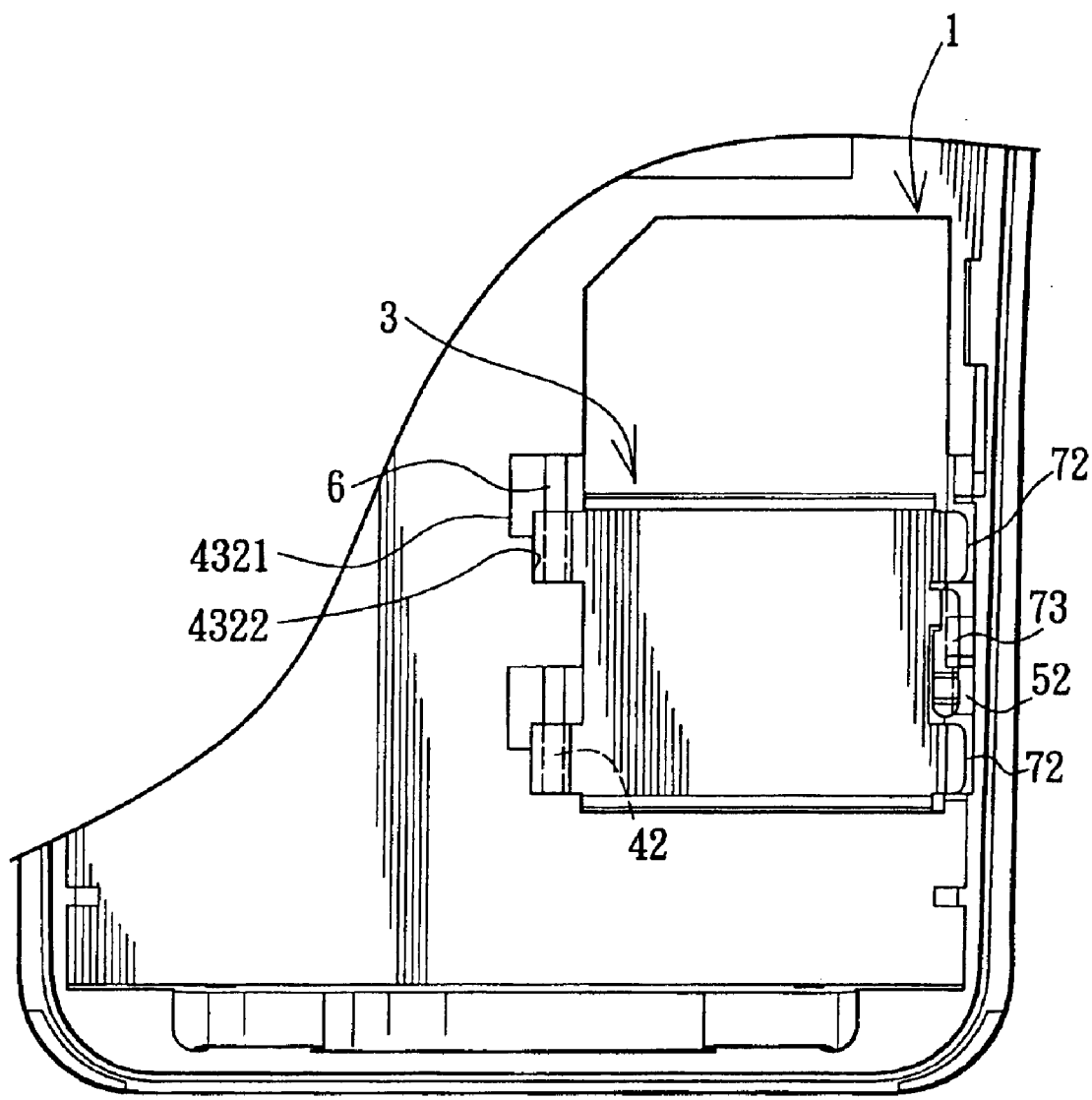
FIG. 6 is a fragmentary top view showing the cover of the electronic device of FIG. 2 when simultaneously positioned at the limiting position and a covering position without being locked.
Figure 7:
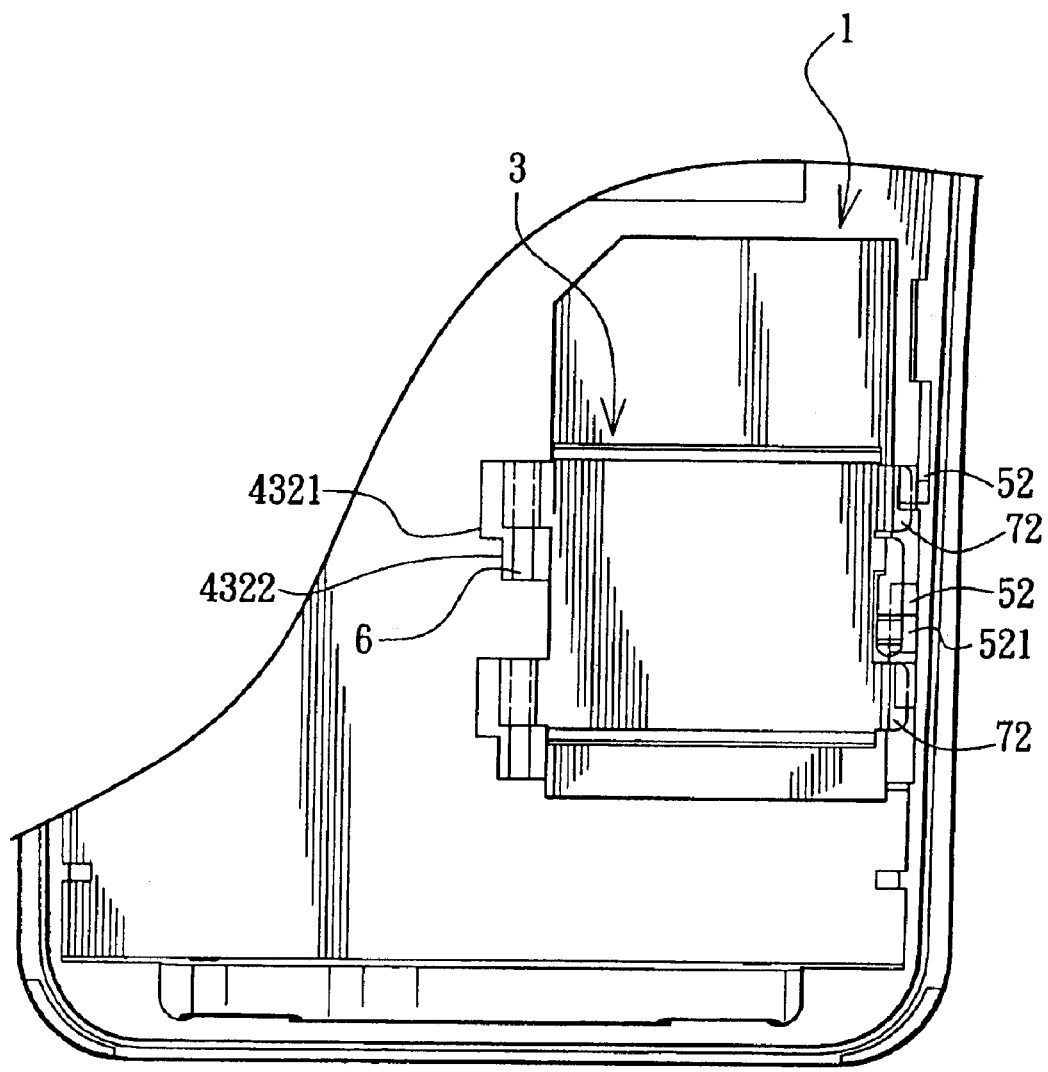
FIG. 7 is a fragmentary top view showing the cover of the electronic device of FIG. 2 when simultaneously positioned at the non-limiting position and the covering position and locked via a locking unit.
Figure 8:
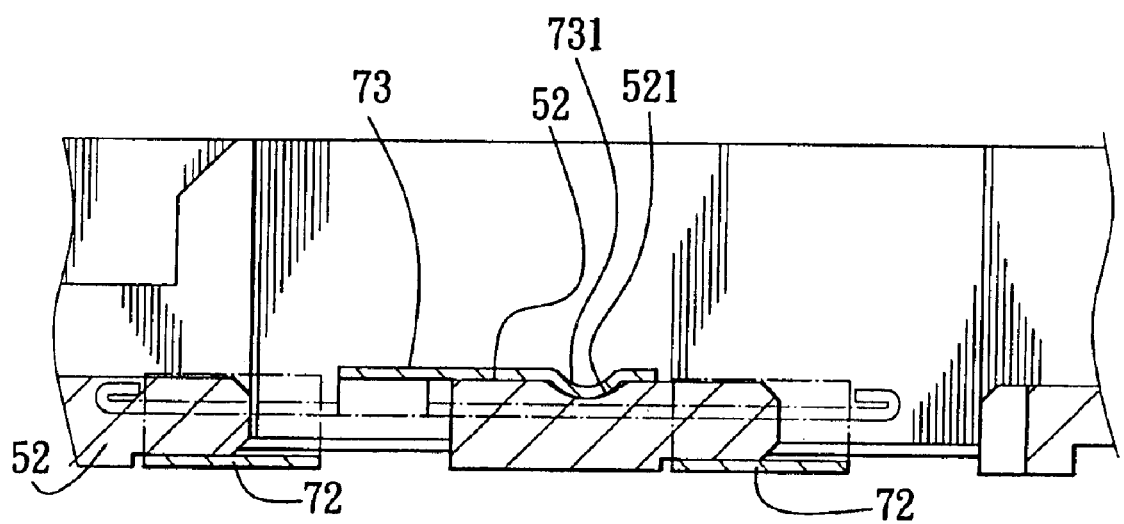
FIG. 8 is a fragmentary sectional view showing the cover of the electronic device of FIG. 2 when simultaneously positioned at the non-limiting position and the covering position and locked via the locking unit.

FIGS. 2 to 8 illustrate an electronic device embodying this invention.

The electronic device includes: a housing 2 with a peripheral wall 20 that is formed with a card-receiving recess 32 having two opposite sides and confined by a recess-confining wall 30, the recess-confining wall 30 including opposite first and second wall portions 301, 302 that respectively confine the opposite sides of the card-receiving recess 32, the first wall portion 301 being formed with at least a pivot-mounting groove 41 (two pivot-mounting grooves 41 are formed in this embodiment) that is confined by a groove-confining wall 40, the groove-confining wall 40 having two opposite ends 441 and a bight portion 432 that faces toward the second wall portion 302 and that is divided into a first section 4321 and a second section 4322 offset from the first section 4322; an electronic card 1 received in the card-receiving recess 32; at least a pivot pin 42 (two pivot pins 42 are provided in this embodiment) substantially parallel to the bight portion 432 of the groove-confining wall 40 and having two opposite ends respectively extending into the opposite ends 441 of the groove-confining wall 40, the pivot pin 42 cooperating with the first section 4321 of the bight portion 432 of the groove-confining wall 40 to define a first gap 410 therebetween, and cooperating with the second section 4322 of the bight portion 432 of the groove-confining wall 40 to define a second gap 411 therebetween, the first gap 410 having a width greater than that of the second gap 411; a cover 3 with opposite first and second sides 301, 302, the first side 301 of the cover 3 being formed with at least a hook 6 (two hooks 6 are formed on the cover 3 in this embodiment) that projects outwardly therefrom, that has a width smaller than that of the first gap 410 and greater than that of the second gap 411, and a length smaller than that of the first gap 410, and that hooks on the pivot pin 42, the cover 3 being rotatable about the pivot pin 42 between a covering position (see FIGS. 6 and 7), in which the second side 302 of the cover 3 is moved toward and presses against the electronic card 1, and an uncovering position (see FIGS. 4 and 5), in which the second side 302 of the cover 3 is moved away from the electronic card 1 so as to release the electronic card 1 therefrom, the cover 3 being movable along the length of the pivot pin 42 between a limiting position (see FIGS. 5 and 6), in which the hook 6 is aligned with the second section 4322 of the bight portion 432 of the groove-confining wall 40, thereby limiting movement of the cover 3 in a transverse direction relative to the pivot pin 42 and preventing disengagement of the hook 6 from the pivot pin 42, and a non-limiting position (see FIGS. 4 and 7), in which the hook 6 is aligned with the first section 4321 of the bight portion 432 of the groove-confining wall 40, thereby permitting movement of the cover 3 in the transverse direction and disengagement of the hook 6 from the pivot pin 42; and a locking unit including first and second interlocking members 5, 7 that are respectively formed on the second wall portion 302 of the recess-confining wall 30 and the second side 302 of the cover 3 and that are releasably engageable with each other when the cover 3 is positioned at the covering position and is then moved from the limiting position to the non-limiting position.

The first interlocking member 5 includes two spaced apart first tabs projecting outwardly from the second wall portion 302 of the recess-confining wall 30 in the transverse direction. Each of the first tabs 52 has top and bottom surfaces 522, 523. The top surface 522 of one of the first tabs 52 is formed with a retaining groove 521. The cover 3 has an upper surface 303. The second interlocking member 7 includes two spaced apart second tabs 72 projecting downwardly from the second side 302 of the cover 3 and then projecting laterally relative to the upper surface 303 of the cover 3 in a direction away from the second side 302 of the cover 3, and an intermediate tab 73 disposed between the second tabs 72 and projecting upwardly from the second side 302 of the cover 3 and then projecting laterally relative to the upper surface 303 of the cover 3 in the direction away from the second side 302 of the cover 3. The intermediate tab 73 is formed with a retaining boss 731. The first and second interlocking members 5, 7 are engageable (see FIG. 8) with each other in such a manner that the second tabs 72 are respectively disposed below and abut against the bottom sides 523 of the first tabs 52, that the intermediate tab 73 is disposed above said one of the first tabs 52 and abuts against the top surface 522 of said one of the first tabs 52, and that the retaining boss 731 engages the retaining groove 521.

The hook 6 is generally C-shaped so that the cover 3 can be easily detached from the pivot pin 42 when the cover 3 is simultaneously moved to the non-limiting position and uncovering position.

By virtue of the configurations of the pivot-mounting groove 41 and the hook 6, the aforesaid drawback as encountered in the prior art can be eliminated.

With the invention thus explained, it is apparent that various modifications can be made without departing from the spirit of the present invention. It is therefore intended that the invention be limited only as recited in the appended claims.

We claim:

1. An electronic device comprising:

a housing including a peripheral wall that is formed with a card-receiving recess having two opposite sides and confined by a recess-confining wall, said recess-confining wall including opposite first and second wall portions that respectively confine said opposite sides of said card-receiving recess, said first wall portion being formed with at least a pivot-mounting groove that is confined by a groove-confining wall, said groove-confining wall having two opposite ends and a bight portion that faces toward said second wall portion and that is divided into a first section and a second section offset from said first section, said card-receiving recess being adapted to receive an electronic card therein;

at least a pivot pin substantially parallel to said bight portion of said groove-confining wall and having two opposite ends respectively extending into said opposite ends of said groove-confining wall, said pivot pin cooperating with said first section of said bight portion of said groove-confining wall to define a first gap therebetween, and cooperating with said second section of said bight portion of said groove-confining wall to define a second gap therebetween, said first gap having a width greater than that of said second gap;

a cover with opposite first and second sides, said first side of said cover being formed with at least a hook that projects outwardly therefrom, that has a width smaller than that of said first gap and greater than that of said second gap, and a length smaller than that of said first gap, and that hooks on said pivot pin, said cover being rotatable about said pivot pin between a covering position, in which said second side of said cover is moved toward and presses against the electronic card, and an uncovering position, in which said second side of said cover is moved away from the electronic card so as to release the electronic card therefrom, said cover being movable along the length of said pivot pin between a limiting position, in which said hook is aligned with said second section of said bight portion of said groove-confining wall, thereby limiting movement of said cover in a transverse direction relative to said pivot pin and preventing disengagement of said hook from said pivot pin, and a non-limiting position, in which said hook is aligned with said first section of said bight portion of said groove-confining wall, thereby permitting movement of said cover in said transverse direction and disengagement of said hook from said pivot pin; and a locking unit including first and second interlocking members that are respectively formed on said second wall portion of said recess-confining wall and said second side of said cover and that are releasably engageable with each other when said cover is positioned at said covering position and is moved from said limiting position to said non-limiting position.

2. The electronic device of claim 1, wherein said first interlocking member includes two spaced apart first tabs projecting outwardly from said second wall portion of said recess-confining wall in said transverse direction, each of said first tabs having top and bottom surfaces, said top surface of one of said first tabs being formed with a retaining groove, said cover having an upper surface, said second interlocking member including two spaced apart second tabs projecting downwardly from said second side of said cover and then projecting laterally relative to said upper surface of said cover in a direction away from said second side of said cover, and an intermediate tab disposed between said second tabs and projecting upwardly from said second side of said cover and then projecting laterally relative to said upper surface of said cover in the direction away from said second side of said cover, said intermediate tab being formed with a retaining boss, said first and second interlocking members being engageable with each other in such a manner that said second tabs are respectively disposed below and abut against said bottom sides of said first tabs, that said intermediate tab is disposed above said one of said first tabs and abuts against said top surface of said one of said first tabs, and that said retaining boss engages said retaining groove.

* * * * *